UNITED STATES PATENT OFFICE.

SARAH E. McINTOSH, OF ALMOND, NEW YORK.

FLAVORING-POWDER.

SPECIFICATION forming part of Letters Patent No. 477,141, dated June 14, 1892.

Application filed November 13, 1890. Serial No. 371,343. (No specimens.)

*To all whom it may concern:*

Be it known that I, SARAH E. MCINTOSH, a citizen of the United States of America, residing at Almond, in the county of Allegany and State of New York, have invented certain new and useful Improvements in Flavoring-Powder; and I do hereby declare the following to be a full, clear, and exact description of the invention, such as will enable others skilled in the art to which it appertains to make and use the same.

This invention relates to improvements in flavoring-powders.

The object of the invention is to provide as a substitute for liquid flavorings a powder which can be readily mixed with flour and is easily handled; and it consists in the employment of albumen or the white of eggs from which the moisture has been evaporated and is reduced by grinding to a flour, to which is added sugar and the flavoring.

When it is desired to make the flavoring-powder, I take the albumen or white of eggs and heat it to evaporate all liquid therefrom, and when thoroughly dried it is reduced to a powder by grinding or otherwise. After the albumen is dried and ground I add thereto a sufficient quantity of sugar, which sugar and albumen form the base of the powder. To this I add flavoring extracts or oils, and when the flavoring has been incorporated a further quantity of albumen is added and the whole thoroughly mixed. It is obvious that any flavor may be used, such as vanilla, lemon, orange, strawberry, &c. A flavoring-powder thus compounded will last and will not deteriorate, and being pulverized very finely can be readily mixed with flour.

Having thus described my invention, what I claim as new, and desire to secure by Letters Patent, is—

A comminuted flavoring composition consisting of dried albumen reduced to a powder, sugar incorporated therewith, the compound thus formed being saturated with a flavoring extract or essential oil, an additional quantity of comminuted albumen being incorporated after the addition of the flavoring, for the purpose set forth.

In testimony whereof I affix my signature in presence of two witnesses.

SARAH E. McINTOSH.

Witnesses:
 GEORGE KARR,
 ISAAC N. HELMER.